United States Patent
Farooq et al.

(10) Patent No.: US 12,548,034 B2
(45) Date of Patent: Feb. 10, 2026

(54) GLOBAL LAYER 1 PROGRAMMABLE LEDGERS

(71) Applicant: JPMORGAN CHASE BANK, N.A., New York, NY (US)

(72) Inventors: Umar Farooq, New York, NY (US); Naveen Mallela, Singapore (SG); Wee Kee Toh, Long Island City, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 36 days.

(21) Appl. No.: 18/601,763

(22) Filed: Mar. 11, 2024

(65) Prior Publication Data

US 2024/0346517 A1    Oct. 17, 2024

Related U.S. Application Data

(60) Provisional application No. 63/489,500, filed on Mar. 10, 2023.

(51) Int. Cl.
| | | |
|---|---|---|
| *G06Q 20/42* | (2012.01) | |
| *G06Q 40/04* | (2012.01) | |
| *G06Q 40/06* | (2012.01) | |

(52) U.S. Cl.
CPC .......... *G06Q 20/425* (2013.01); *G06Q 40/04* (2013.01); *G06Q 40/067* (2025.08)

(58) Field of Classification Search
USPC ........................................................ 705/44
See application file for complete search history.

(56) References Cited

U.S. PATENT DOCUMENTS

| | | | | |
|---|---|---|---|---|
| 10,282,558 | B2 * | 5/2019 | Chan et al. | G06F 21/6245 |
| 11,288,736 | B1 * | 3/2022 | Jette et al. | G06Q 40/025 |
| 2019/0147532 | A1 * | 5/2019 | Singh et al. | G06Q 40/04 |
| 2019/0342095 | A1 * | 11/2019 | Simons | H04L 9/321 |
| 2020/0076823 | A1 * | 3/2020 | Coonrod | H04L 63/107 |
| 2020/0167770 | A1 * | 5/2020 | Kurian et al. | G06Q 20/389 |
| 2022/0138328 | A1 * | 5/2022 | Weber et al. | G06F 21/602 |
| 2022/0138688 | A1 * | 5/2022 | Schornack et al. | G06Q 10/101 |
| 2022/0358030 | A1 * | 11/2022 | Yanamala et al. | G06F 11/3684 |

OTHER PUBLICATIONS

Global Layer One, Foundation Layer for Financial Networks, Jun. 2024, Monetary Authority of Singapore, pp. 1-21. (Year: 2024).*

* cited by examiner

*Primary Examiner* — Bennett M Sigmond
*Assistant Examiner* — George N. Proios
(74) *Attorney, Agent, or Firm* — GREENBERG TRAURIG LLP

(57) ABSTRACT

Global layer 1 programmable ledgers are disclosed. According to an embodiment, a global layer 1 programmable ledger may include: a plurality of nodes comprising a shared capabilities and components tier comprising foundational applications and functional applications, and a financial institution applications tier comprising financial institution application, wherein the global layer 1 programmable ledger is part of a distributed ledger network; and each of the plurality of nodes is associated with a participant of a distributed ledger network, and each participant is configured to access the foundational applications and functional applications and the financial institution applications.

20 Claims, 2 Drawing Sheets

GLOBAL LAYER 1 PROGRAMMABLE LEDGERS

RELATED APPLICATIONS

This application claims priority to, and the benefit of, U.S. Provisional Patent Application Ser. No. 63/489,500, filed Mar. 10, 2023, the disclosure of which is hereby incorporated, by reference, in its entirety.

BACKGROUND OF THE INVENTION

1. Field of the Invention

Embodiments are generally directed to global layer 1 ("L1") programmable ledgers.

2. Description of the Related Art

Public blockchain networks are designed to be open and accessible to all parties. In essence, they are similar to the Internet in that participants can use shared infrastructure to deploy their specific use cases. Public blockchain networks also enable the concept of composability, where applications can interact seamlessly with other applications built and deployed on a common platform. Composability enhances automation, including cross-industry automation across multiple parties. Applications can be built on capabilities of other applications, providing a much richer and wider suite of services to users.

Despite their many advantages, public blockchain networks suffer from significant shortcomings that limit their utility for regulated financial institutions. For example, there are concerns around governance of public blockchains, such as a lack of legal entity that is responsible for the network, lack of enforceable Service Level Agreements (SLAs) on performance and resiliency, and lack of certainty and guarantees around processing of transactions. Moreover, the public blockchain space seems to be evolving towards a trade-off between "wasting significant natural resources" (e.g., the proof of work) and relying on unregulated validators (e.g., the proof of stake). These concerns mean that public blockchains are unlikely to meet current regulatory requirements or guidelines relating to technology risk management and outsourcing, and pose difficulties for financial institutions to use or deploy applications on them.

SUMMARY OF THE INVENTION

Global layer 1 programmable ledgers are disclosed. According to an embodiment, a global layer 1 programmable ledger may include: a plurality of nodes comprising a shared capabilities and components tier comprising foundational applications and functional applications, and a financial institution applications tier comprising financial institution application, wherein the global layer 1 programmable ledger is part of a distributed ledger network; and each of the plurality of nodes is associated with a participant of a distributed ledger network, and each participant is configured to access the foundational applications and functional applications and the financial institution applications.

In one embodiment, the distributed ledger network may include a permissioned distributed ledger network.

In one embodiment, the global layer 1 programmable ledger may also include a side chain in communication with the distributed ledger network. The side chain may be configured to store information governed by a local jurisdiction, and may be maintained within the local jurisdiction.

In one embodiment, the foundational applications comprise a digital identity application, a digital currency application, and/or a digital assets application.

In one embodiment, the functional applications comprise an embedded policy and regulation application, an automated market making mechanisms application, an atomic settlement application, and/or a regulatory reporting application.

In one embodiment, the financial institution applications comprise a trade platform application, a trade finance application, a foreign currency exchange application, a settlement application, and/or a collateral settlement application.

In one embodiment, the distributed ledger network may include a plurality of validators that are configured to use a consensus mechanism to process transactions.

In one embodiment, the financial institution applications are provided by participants.

In one embodiment, access to the shared capabilities and components tier and the financial institution applications tier may be permissioned. Permissions to access the shared capabilities and components tier and the financial institution applications tier are different.

According to another embodiment, a system may include: a global layer 1 programmable ledger comprising a plurality of nodes comprising a shared capabilities and components tier comprising foundational applications and functional applications, and a financial institution applications tier comprising financial institution applications; a distributed ledger network in communication with the plurality of nodes; and a side chain. Each of the plurality of nodes may be associated with a participant of the distributed ledger network, and each participant may be configured to access the foundational applications and functional applications and the financial institution applications.

In one embodiment, the distributed ledger network may include a permissioned distributed ledger network.

In one embodiment, the side chain may be configured to store information governed by a local jurisdiction, and may be maintained within the local jurisdiction.

In one embodiment, the foundational applications comprise a digital identity application, a digital currency application, and/or a digital assets application.

In one embodiment, the functional applications comprise an embedded policy and regulation application, an automated market making mechanisms application, an atomic settlement application, and/or a regulatory reporting application.

In one embodiment, the financial institution applications comprise a trade platform application, a trade finance application, a foreign currency exchange application, a settlement application, and/or a collateral settlement application.

In one embodiment, the distributed ledger network may include a plurality of validators that are configured to use a consensus mechanism to process transactions.

In one embodiment, access to the shared capabilities and components tier and the financial institution applications tier may be permissioned, and permissions to access the shared capabilities and components tier and the financial institution applications tier are different.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Global layer 1 programmable ledgers are disclosed.

In embodiments, a permissioned network that may be operated by financial institutions for the financial services industry may enable the realization of such benefits while minimizing the risks and concerns identified above. Such a network may be built on principles of openness and accessibility that are similar to public blockchain, but with membership restricted to known regulated financial institutions. It may also adhere to best practices of financial markets infrastructures, such as a focus on cybersecurity and potential defenses to threats from new and developing technologies, such as quantum computing-based security challenges.

In embodiments, a permissioned network is disclosed. Such a network may be designed to be: (1) accessible, both functionally and economically (e.g., all financial institutions within the membership criteria may be allowed to participate. Membership criteria, operating costs and fees (if any) may be designed to maintain the integrity, stability and sustainability of the network but not to impose exclusivity.); (2) open (e.g., technology specifications may be made public and open, and members may be able to build and deploy applications without needless hindrance. There may be a need for governance and review of applications to ensure integrity and stability of the network); (3) standards-based (e.g., industry standards and open source protocols, such as ISO 20022 for transaction messages and ERC-20 for tokens, may be used where appropriate. Where existing standards have not been developed or are inadequate, embodiments may provide designs that are flexible and can be proposed or incorporated into future standards); (4) well-governed (e.g., appropriate governance and operating arrangements, membership agreements and rules that are clear and transparent may be in place to ensure clear lines of responsibility and accountability, and fair and equitable treatment of all stakeholders); (5) compliant with regulations (e.g., the network may comply with relevant regulatory requirements and guidelines, which may include Principles of Financial Markets Infrastructures (PFMIs), and ensure that financial institutions' use of the network does not contravene regulatory requirements, particularly those relating to management of technology and outsourcing risks); and (6) accessible to regulators (e.g., regulators and central banks may access the network and have visibility on relevant transactions).

Figure 1:
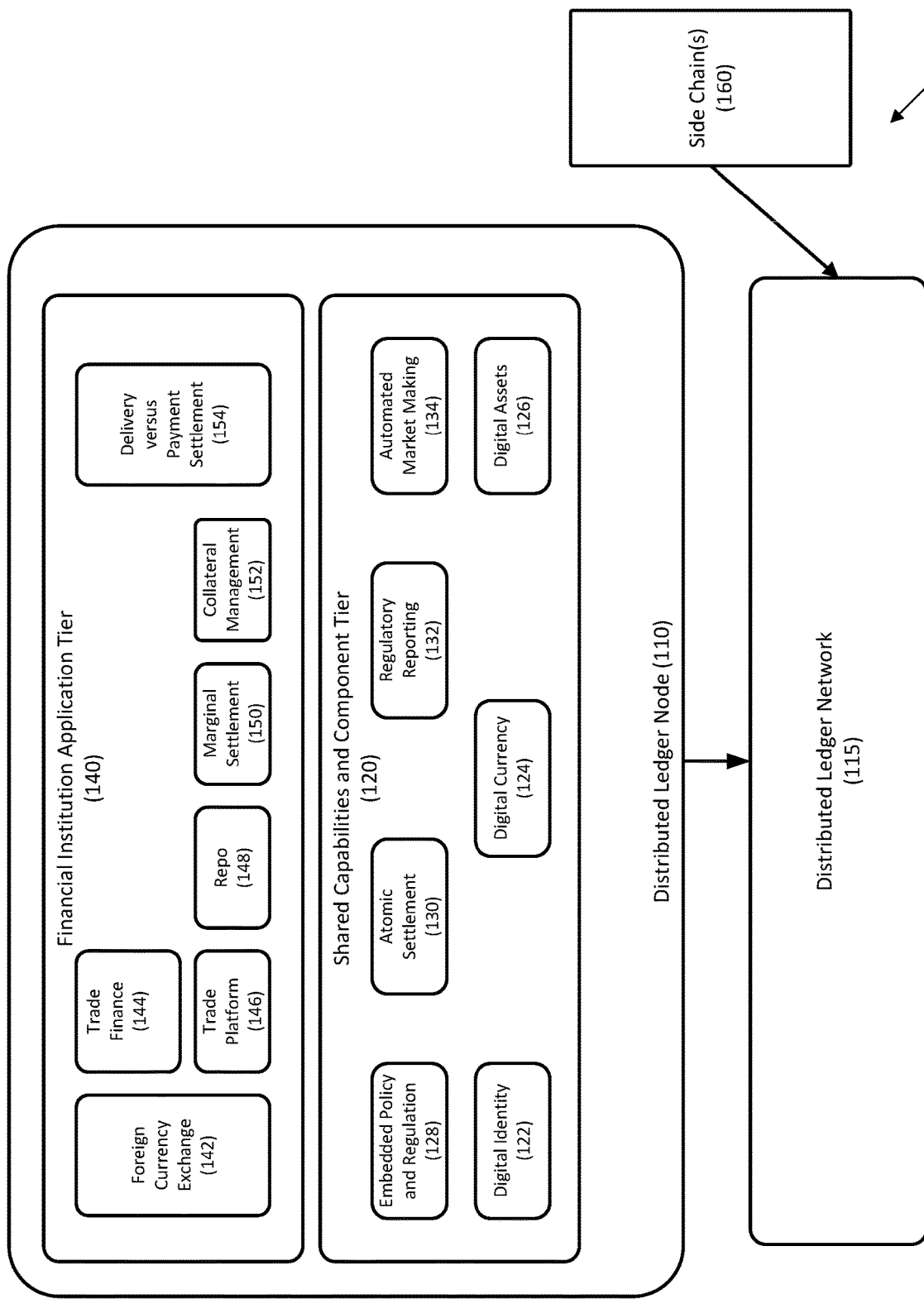
FIG. 1 illustrates a global layer 1 programmable ledger according to an embodiment.

Referring to FIG. 1, an exemplary architecture for a global L1 ledger is disclosed according to an embodiment. System 100 may include distributed ledger network 115 and node 110.

Distributed ledger network 115 may be built as a core part of a global L1 programmable ledger and may be responsible for recording data and executing applications. Distributed ledger network 115 may be a permissioned blockchain network. Distributed ledger network 115 may be operated as a consortium blockchain platform, with nodes 110 operated by participants, such as financial institutions and central banks. For example, FIs may include commercial banks, securities exchanges and other trading venues, central securities depositories (CSD), payment services providers, insurers, etc. Members may take one or more different roles in the network, including node host, network operator, technology provider, foundational applications developer, application developer, and participant.

A node host may be a participant that hosts one of nodes 110 on distributed ledger network 115 that may contribute to the processing and validating of transactions.

A network operator may be responsible for operating distributed ledger network 115. This may involve day-to-day operations such as managing membership and onboarding new members, and technology operations such as coordinating and deploying software updates and monitoring network health.

A technology provider may be part of the network operator or a separate entity, and may be responsible for developing and maintaining distributed ledger network 115.

A foundational applications developer may lead the development and maintenance of foundational applications.

An application developer may develop and deploy applications on distributed ledger network 115.

A participant may use financial institution ("FI") applications in FI applications tier 140, shared capabilities and components in shared capabilities and components tier 120, and may transact on distributed ledger network 115.

In embodiments, governance may be provided via smart contracts.

Each node 110 may include multiple tiers, such as shared capabilities and components tier 120 and FI applications in FI applications tier 140. Each tier may require certain permissions in order to access the applications and/or components in that tier. The permissions required for each tier may be different, and may be based on the role of the participant. In addition, each application, each application and/or component may have a separate permission requirement.

The FI applications and the shared 120 may be part of the core global layer 1 programmable ledger and may be provided to all participants. The FI applications and the shared applications may be built or provided by member financial institution.

The shared capabilities and components may include applications that may be built as native capabilities for distributed ledger network 115 and may be primarily components or capabilities that may be used and reused by the FI applications. The shared capabilities and components may be designed for reuse and composability and may include foundational applications and functional applications.

The foundational applications may be building blocks that are foundational to the financial industry use-case applications, such as digital identity application 122, digital currency application 124, and digital assets application 126. Other foundational applications may be provided as is necessary and/or desired. For digital currency application 124 and digital assets application 126, the foundational applications may be extensible templates that may be used and reused. For example, digital currency application 124 may include Central Bank Digital Currencies ("CBDCs") that may be issued by central banks, or deposit tokens issued by commercial banks for different currencies. A single template may ensure composability and that use-case applications may make use of different digital currency tokens in the same way.

Digital identity application 122 is an example of a foundational application that provides on-chain verification of identity, and performance of Anti-Money Laundering/Countering the Financing of Terrorism (AML/CFT) screening and other relevant control processes.

The functional applications may provide other capabilities that are reused or shared across applications. An example of a functional application is embedded policy and regulation application 128, where regulations may be embedded as smart contracts that can ensure adherence to regulatory policies of relevant jurisdictions. Another example of a functional application is automated market making mechanisms application 134, where liquidity pools of CBDCs and deposit tokens in different currencies could be created to facilitate foreign exchange.

Atomic settlement application 130 and regulatory reporting application 132 may provide settlement and reporting capabilities to the participants.

The FI applications may be built and deployed by participants, such as member financial institutions. The FI applications may be industry-wide in nature, such as trade platform application 146 that may be used to exchange trade documents and initiate payments correspondingly. Trade finance application 144 may be developed to make use of the trade documents for financing purposes.

Other examples of FI applications may include foreign currency exchange application 142, repurchase agreement application 148, marginal settlement application 150, collateral management application 152, and delivery versus payment ("DvP") settlement application 154 for other asset types (e.g., securities, commodities, derivatives, real estate, etc.).

Other types of FI applications may be provided as is necessary and/or desired.

In one embodiment, system 100 may use a consensus mechanism that enables high transaction volume and high-speed processing at low cost. For example, embodiments may use validators (not shown) that are trusted by the network, such as regulators, central banks, regulated financial institutions, etc. These validators may be effectively authorized to perform this function and hence the distributed ledger may use a "Proof of Authority" consensus.

In embodiments, one or more side chains 160 may be provided as is necessary and/or desired. Side chains 160 may be provided for different jurisdictions, for transactions, information, activity, etc. that may fall under certain regulations, etc. For example, certain jurisdictions may require that local transactions are maintained on a local side chain and not on the global ledger. As another example, certain regulations, like privacy regulations, may make it prudent or desirable to have transactions, information, activity, etc. on a side chain that may be local to the jurisdiction promulgating the regulation.

Other reasons for using side chains 160 may be provided as is necessary and/or desired.

In one embodiment, side chains 160 may be maintained within the local jurisdiction.

Embodiments may also provide Infrastructure as a Service (IaaS) and Software as a Service (SaaS) to member financial institutions.

Figure 2:
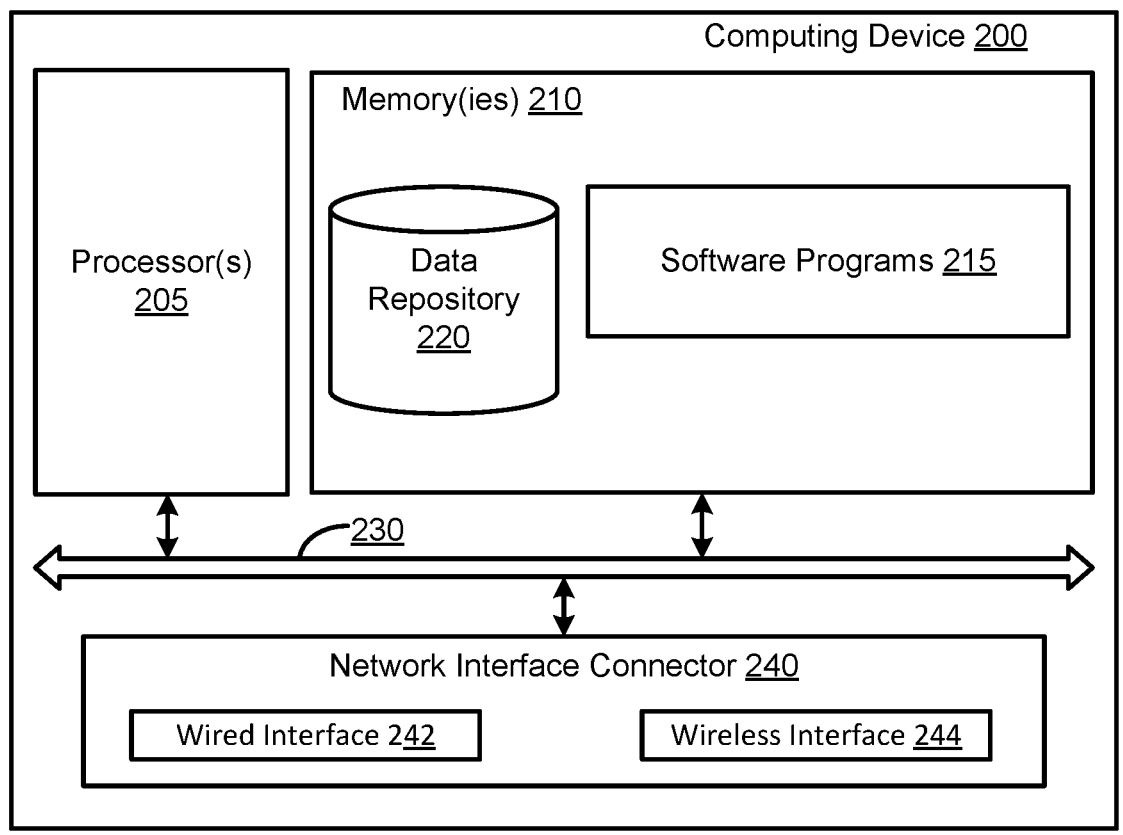
FIG. 2 illustrates a block diagram of a technology infrastructure and computing device for implementing certain embodiments of the present disclosure.

FIG. 2 depicts an exemplary computing system for implementing aspects of the present disclosure. FIG. 2 depicts exemplary computing device 200. Computing device 200 may represent the system components described herein. Computing device 200 may include processor 205 that may be coupled to memory 210. Memory 210 may include volatile memory. Processor 205 may execute computer-executable program code stored in memory 210, such as software programs 215. Software programs 215 may include one or more of the logical steps disclosed herein as a programmatic instruction, which may be executed by processor 205. Memory 210 may also include data repository 220, which may be nonvolatile memory for data persistence. Processor 205 and memory 210 may be coupled by bus 230. Bus 230 may also be coupled to one or more network interface connectors 240, such as wired network interface 242 or wireless network interface 244. Computing device 200 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A global layer 1 programmable ledger, comprising:
a ledger core executed by a backend computer processor comprising:
   a financial institution applications tier comprising financial institution applications that are available to all participants; and
   a shared capabilities and components tier comprising foundational applications and functional applications that are foundational to and used by the financial institution applications; and
a distributed ledger network comprising a plurality of nodes, wherein each of the plurality of nodes is executed by a computer processor and is associated with a participant of the distributed ledger network, and each participant is configured to access the foundational applications and functional applications and the financial institution applications using its respective node.

2. The global layer 1 programmable ledger of claim 1, wherein the distributed ledger network comprises a permissioned distributed ledger network.

3. The global layer 1 programmable ledger of claim 1, further comprising a side chain in communication with the distributed ledger network.

4. The global layer 1 programmable ledger of claim 3, wherein the side chain is configured to store information governed by a local jurisdiction.

5. The global layer 1 programmable ledger of claim 4, wherein the side chain is maintained within the local jurisdiction.

6. The global layer 1 programmable ledger of claim 1, wherein the foundational applications comprise a digital identity application, a digital currency application, and/or a digital assets application.

7. The global layer 1 programmable ledger of claim 1, wherein the functional applications comprise an embedded policy and regulation application, an automated market making mechanisms application, an atomic settlement application, and/or a regulatory reporting application.

8. The global layer 1 programmable ledger of claim 1, wherein the financial institution applications comprise a trade platform application, a trade finance application, a foreign currency exchange application, a settlement application, and/or a collateral settlement application.

9. The global layer 1 programmable ledger of claim 1, wherein the distributed ledger network comprises a plurality of validators that are configured to use a consensus mechanism to process transactions.

10. The global layer 1 programmable ledger of claim 1, wherein the financial institution applications are provided by participants.

11. The global layer 1 programmable ledger of claim 1, wherein access to the shared capabilities and components tier and the financial institution applications tier is permissioned.

12. The global layer 1 programmable ledger of claim 11, wherein permissions to access the shared capabilities and components tier and the financial institution applications tier are different.

13. A system comprising:
a global layer 1 programmable ledger executed by a backend computer processor, comprising:
   a financial institution applications tier comprising financial institution applications that are available to all participants; and
   a shared capabilities and components tier comprising foundational applications and functional applications that are foundational to and used by the financial institution applications;
a distributed ledger network comprising a plurality of nodes in communication with the plurality of nodes, each node executed by a computer processor, wherein each of the plurality of nodes is associated with a participant of the distributed ledger network, and each participant is configured to access the foundational applications and functional applications and the financial institution applications using its respective node; and
a side chain.

14. The system of claim 13, wherein the distributed ledger network comprises a permissioned distributed ledger network.

15. The system of claim 13, wherein the side chain is configured to store information governed by a local jurisdiction, and is maintained within the local jurisdiction.

16. The system of claim 13, wherein the foundational applications comprise a digital identity application, a digital currency application, and/or a digital assets application.

17. The system of claim 13, wherein the functional applications comprise an embedded policy and regulation application, an automated market making mechanisms application, an atomic settlement application, and/or a regulatory reporting application.

18. The system of claim 13, wherein the financial institution applications comprise a trade platform application, a trade finance application, a foreign currency exchange application, a settlement application, and/or a collateral settlement application.

19. The system of claim 13, wherein the distributed ledger network comprises a plurality of validators that are configured to use a consensus mechanism to process transactions.

20. The system of claim 13, wherein access to the shared capabilities and components tier and the financial institution applications tier is permissioned, and permissions to access the shared capabilities and components tier and the financial institution applications tier are different.

* * * * *